United States Patent [19]
Clark, Jr.

[11] Patent Number: 5,857,693
[45] Date of Patent: Jan. 12, 1999

[54] DIAL BALL MOUNT FOR A TRAILER HITCH

[76] Inventor: Richard A. Clark, Jr., Rte. 1 Box 100C, Richmond Hill, Ga. 31324

[21] Appl. No.: 759,048

[22] Filed: Dec. 2, 1996

[51] Int. Cl.⁶ ..................................................... B60D 1/07
[52] U.S. Cl. ........................................ 280/415.1; 280/511
[58] Field of Search ............................. 280/415.1, 416.1, 280/504, 511

[56] References Cited

U.S. PATENT DOCUMENTS

| | | | |
|---|---|---|---|
| 2,911,233 | 11/1959 | Riddle | 280/415.1 |
| 4,280,713 | 7/1981 | Bruhn | 280/415.1 |
| 4,456,279 | 6/1984 | Dirck | 280/415.1 |
| 5,044,652 | 9/1991 | Brisson | 280/416.1 |
| 5,106,114 | 4/1992 | Haupt | 280/416.1 |
| 5,158,316 | 10/1992 | Hutchmacher | 280/415.1 |
| 5,265,899 | 11/1993 | Harrison | 280/416.1 |
| 5,322,313 | 6/1994 | Schroeder | 280/416.1 |
| 5,351,982 | 10/1994 | Walrath | 280/416.1 |
| 5,560,630 | 10/1996 | Phares et al. | 280/416.1 |

*Primary Examiner*—Kevin Hurley
*Attorney, Agent, or Firm*—Michael I. Kroll

[57] ABSTRACT

A dial ball mount (34) for a trailer hitch (36) comprising a main frame (38) having a shank (40) that fits into a box end receiver (42) of the trailer hitch (36). A component (44) is for holding a first end of the shank (40) of the main frame (38) within the box end receiver (42) of the trailer hitch (36). A turret (46) is provided with a plurality of hitch balls (48) radially affixed onto the turret (46). An assembly (50) is for mounting the turret (46) in a rotatable manner to the main frame (38). A facility (52) is for retaining the turret (46) in a stationary manner on the main frame (38), so that any one of the hitch balls (48) can be aligned into position to receive a matching trailer coupler on a tow bar connected to a trailer.

14 Claims, 7 Drawing Sheets

DIAL BALL MOUNT FOR A TRAILER HITCH

BACKGROUND OF THE INVENTION

1. Field of the Invention

The instant invention relates generally to towing devices and more specifically it relates to a dial ball mount for a trailer hitch. The dial ball mount can be used with different types of trailer hitches for towing most boats, utility trailers and small or medium camping trailers.

2. Description of the Prior Art

Numerous towing devices have been provided in prior art that are each adapted to be used for towing one particular type of trailer at one time. While these units may be suitable for the particular purpose to which they address, they would not be as suitable for the purposes of the present invention as heretofore described.

SUMMARY OF THE INVENTION

A primary object of the present invention is to provide a dial ball mount for a trailer hitch that will overcome the shortcomings of the prior art devices.

Another object is to provide a dial ball mount for a trailer hitch that is constructed to accept a plurality of the most common trailer hookups in one assembly with no extra parts to loose.

An additional object is to provide a dial ball mount for a trailer hitch in which no special tools are needed to change the ball mounts, while it is durable and safe to use.

A further object is to provide a dial ball mount for a trailer hitch that is simple and easy to use.

A still further object is to provide a dial ball mount for a trailer hitch that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein;

FIG. 1a is an enlarged perspective view indicated by arrow 1a in FIG. 1, showing the prior art ball mount hitch in greater detail.

Similar reference characters denote corresponding features consistently throughout the attached drawings.

DETAILED DESCRIPTION OF THE PREFERRED EMBODIMENTS

Figure 1:
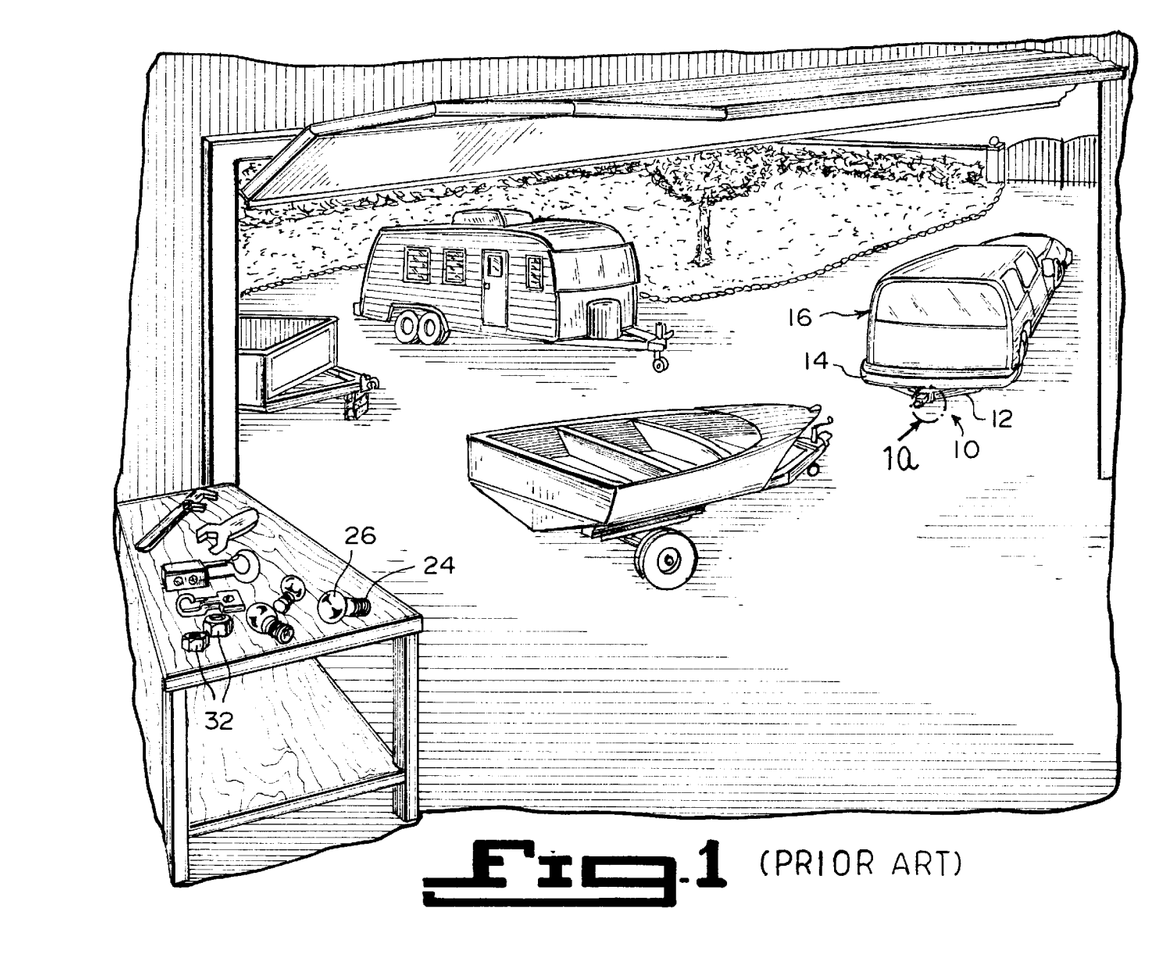
FIG. 1 is a perspective view of the prior art mounted to a motor vehicle in a driveway of a garage.

Turning now descriptively to the drawings, in which similar reference characters denote similar elements throughout the several views, FIGS. 1 and 1a illustrate the prior art being a conventional ball mount hitch 10. It consists of a box end receiver 12 connected to the underside of a bumper 14 of a motor vehicle 16. A ball mount 18 is inserted into the box end receiver 12 and is retained thereto by a slide pin 20 and a clip 22. Threaded shanks 24 of different sized hitch ball s 26 can be inserted into a socket 28 of the ball mount 18 and held thereto by a lock washer 30 and retainer nut 32.

The instant invention is shown in FIGS. 2 through 6 and is a dial ball mount 34 for a trailer hitch 36, comprising a main frame 38 having a shank 40 that fits into a box end receiver 42 of the trailer hitch 36. A component 44 is for holding a first end of the shank 40 of the main frame 38 within the box end receiver 42 of the trailer hitch 36. A turret 46 is provided, with a plurality of hitch balls 48 radially affixed onto the turret 46. An assembly 50 is for mounting the turret 46 in a rotatable manner to the main frame 38. A facility 52 is for retaining the turret 46 in a stationary manner on the main frame 38, so that any one of the hitch balls 48 can be aligned into position to receive a matching trailer coupler on a tow bar connected to a trailer (not shown).

The holding component 44 is a hitch pin 54 that can extend transversely through the box end receiver 42 of the trailer hitch 36 and the first end of the shank 40. The turret 46 is a disc member 56, having a central opening 58 and a plurality of position holes 60 radially placed about the central opening 58.

The hitch balls 26 are of various diameter sizes, which can match up to its respective trailer coupler, when properly positioned by rotation of the turret 46 and locked by the retaining facility 52. The main frame 38 includes a lower plate 62 having a central opening 64 therethrough. An upper plate 66 has a central opening 68 therethrough in alignment with the central opening 64 in the lower plate 62. The upper plate 66 also has a positioning aperture 68 therethrough.

The mounting assembly 50 comprises a nut 72 affixed to a bottom surface of the lower plate 62 and is in alignment with the central opening 64 in the lower plate 62. A swivel bolt 74 has a threaded shaft 76, which extends through the central opening 58 in the disc member 56, the central opening 68 in the upper plate 66, the central opening 64 in the lower plate 62 and then is threaded into the nut 72. A safety pin 78 is transversely inserted through the nut 72 and the shaft 76 of the swivel bolt 74, to hold the swivel bolt 74 securely in place, while allowing the disc member 56 to rotate above the upper plate 66.

Figure 2:
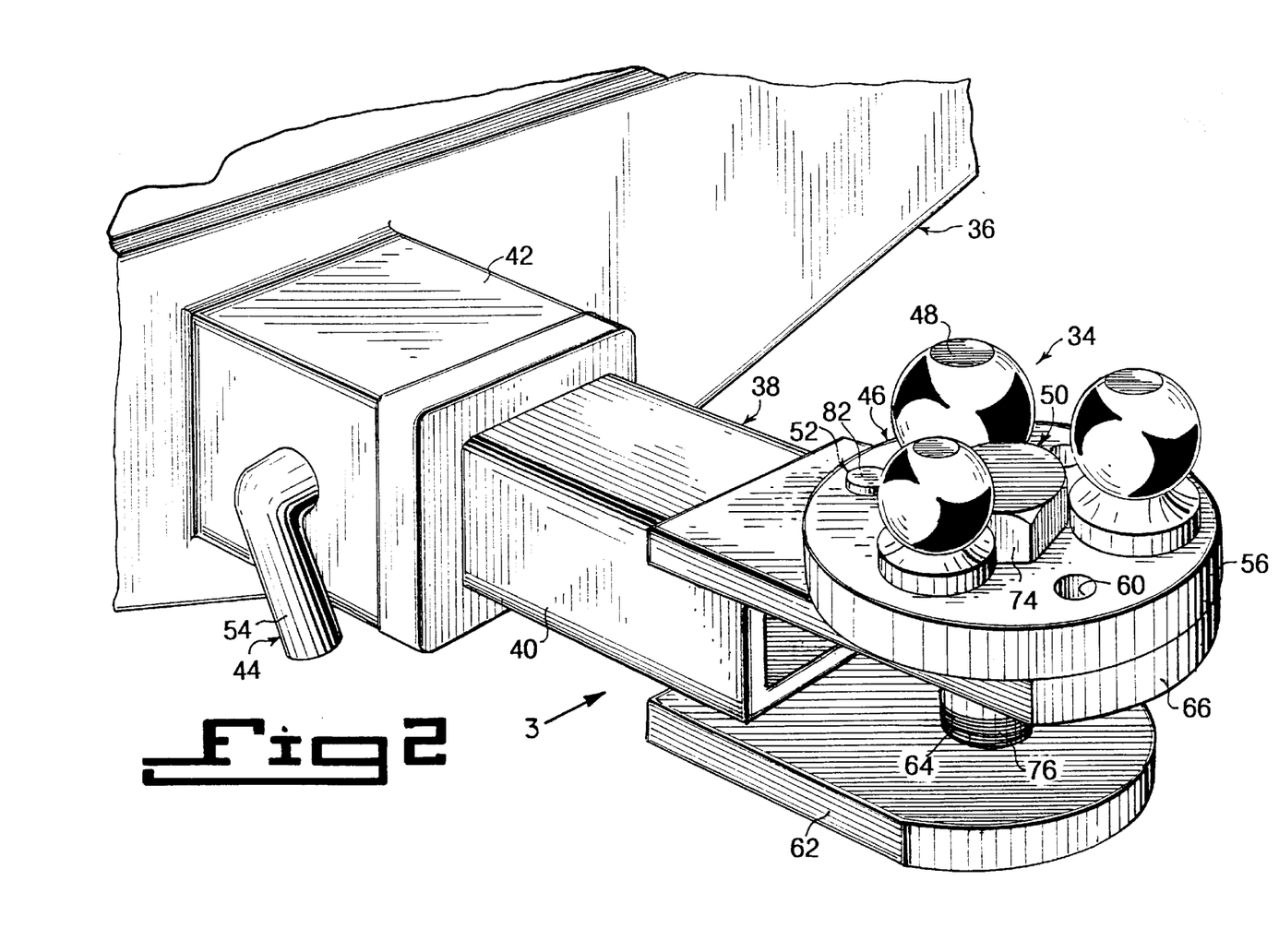
FIG. 2 is a perspective view of a first embodiment of the instant invention.
Figure 3:
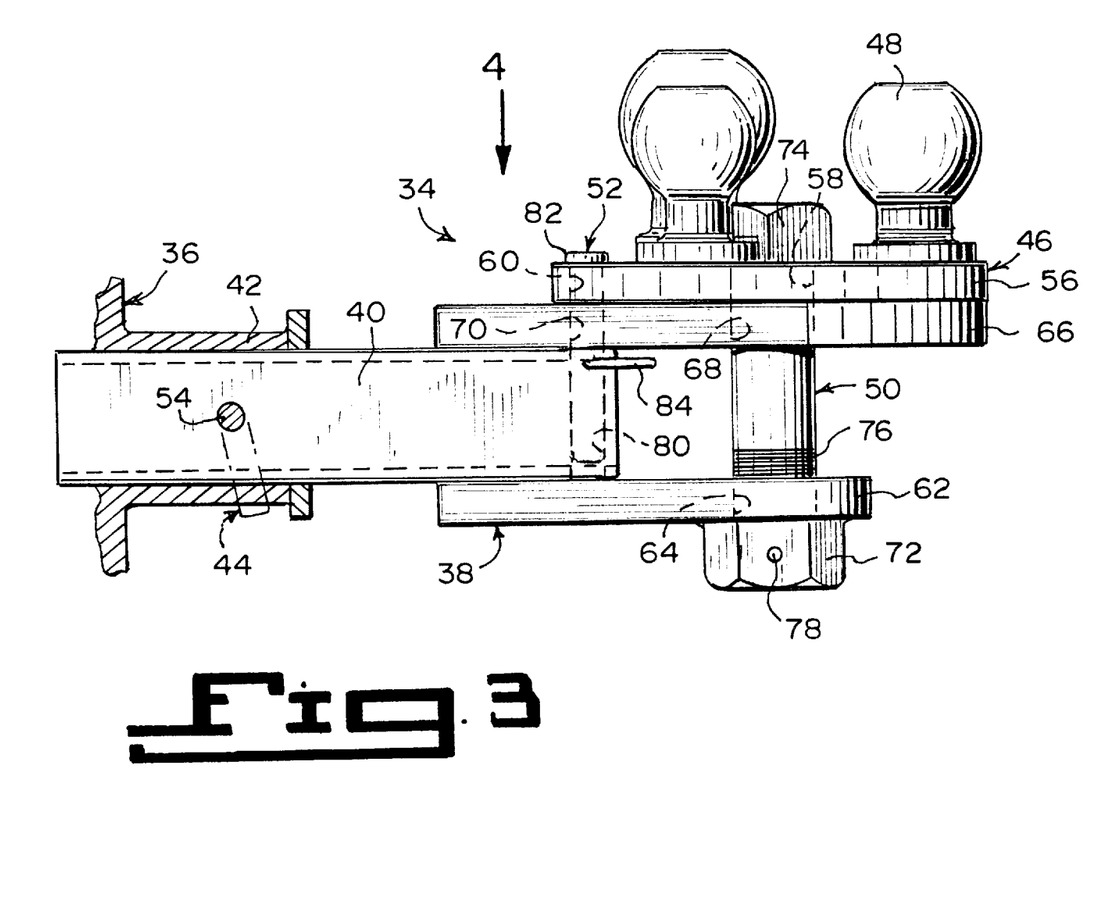
FIG. 3 is a side view taken in the direction of arrow 3 in FIG. 2, with parts broken away and in section.
Figure 4:
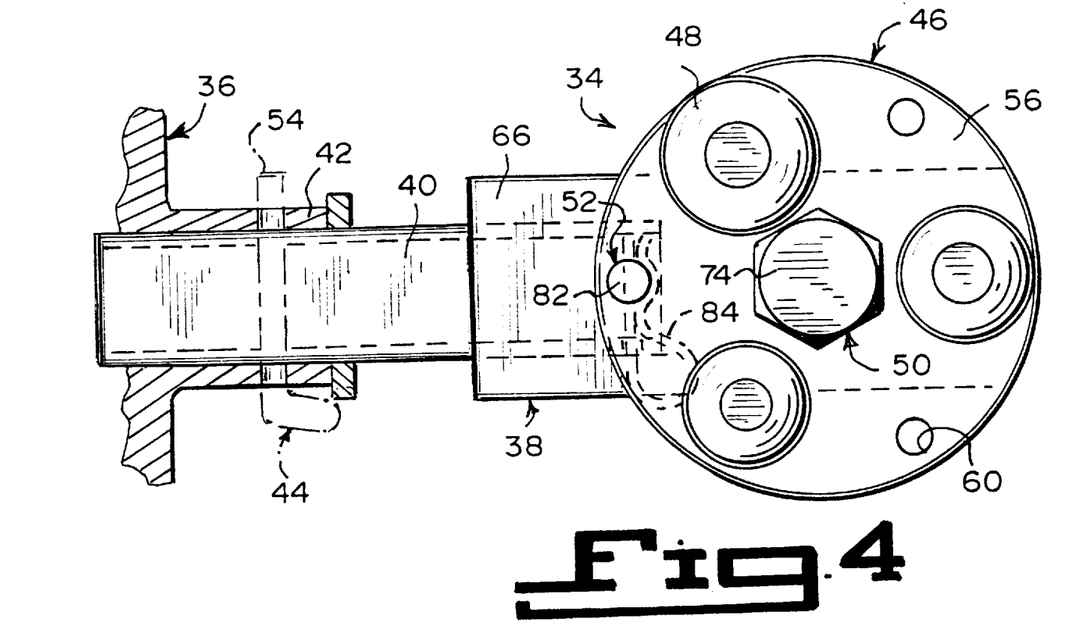
FIG. 4 is a top view taken in the direction of arrow 4 in FIG. 3.

The main frame 38, as shown in FIGS. 2 to 4, consists of the lower plate 62 affixed to a bottom surface at a second end of the shank 40 in an overhanging manner. The upper plate 66 is also affixed to a top surface at the second end of the shank 40 in an overhanging manner. The retaining facility 52 includes the second end of the shank 40 having a vertical aperture 80 therethrough. A position pin 82 can be inserted through one of the position holes 60 in the disc member 56, the positioning aperture 70 in the upper plate 66 and the vertical aperture 80 in the second end of the shank 40. A safety clip 84 can be inserted transversely through the vertical aperture 80 in the second end of the shank 40 and the position pin 82, to keep the position pin 82 in place.

Figure 5:
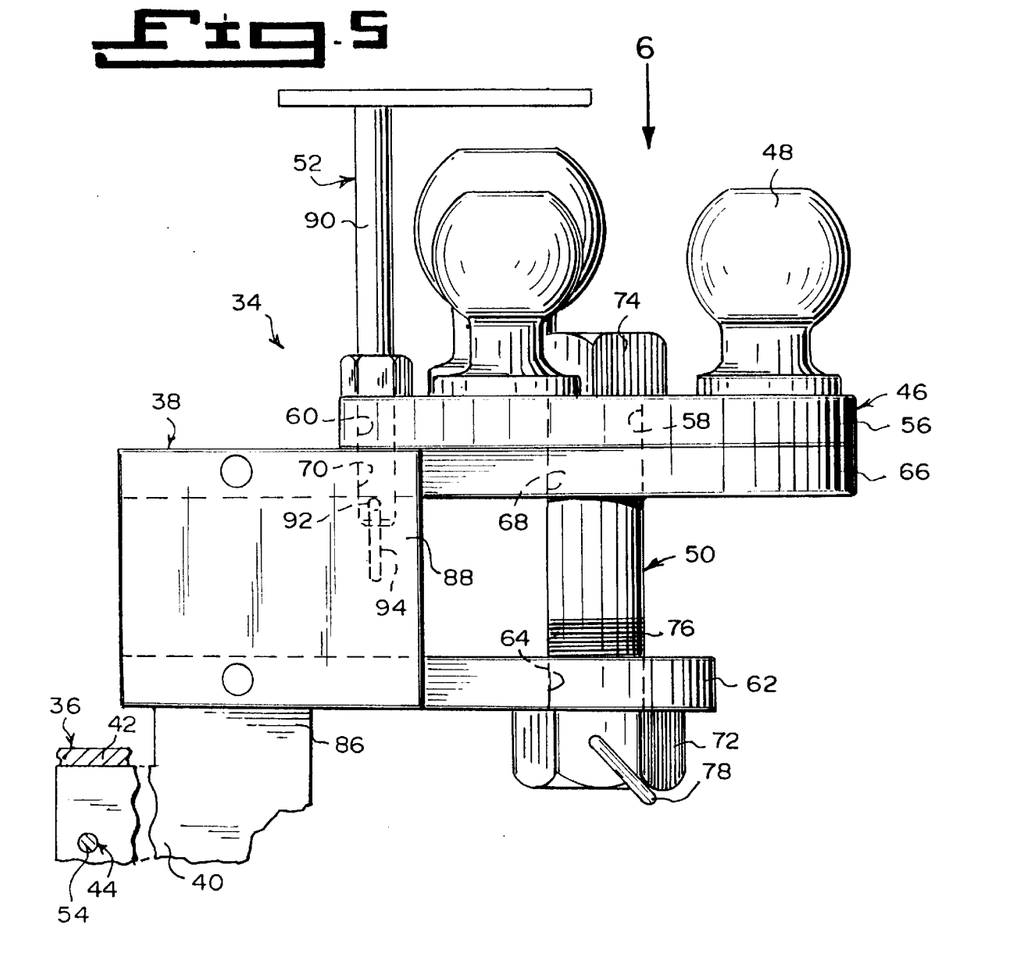
FIG. 5 is a side view of a second embodiment of the instant invention.
Figure 6:
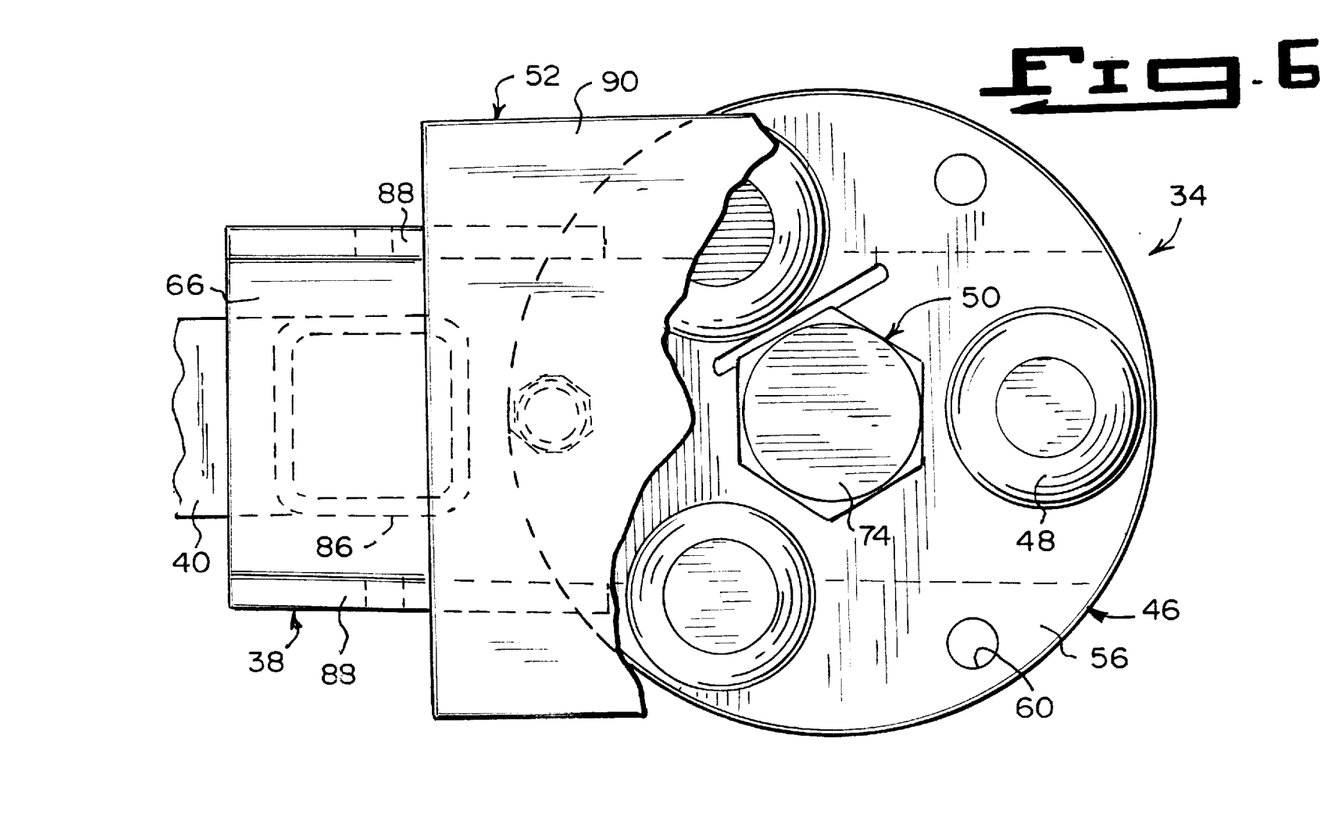
FIG. 6 is a top view taken in the direction of arrow 6 in FIG. 5, with parts broken away.
Figure 10:
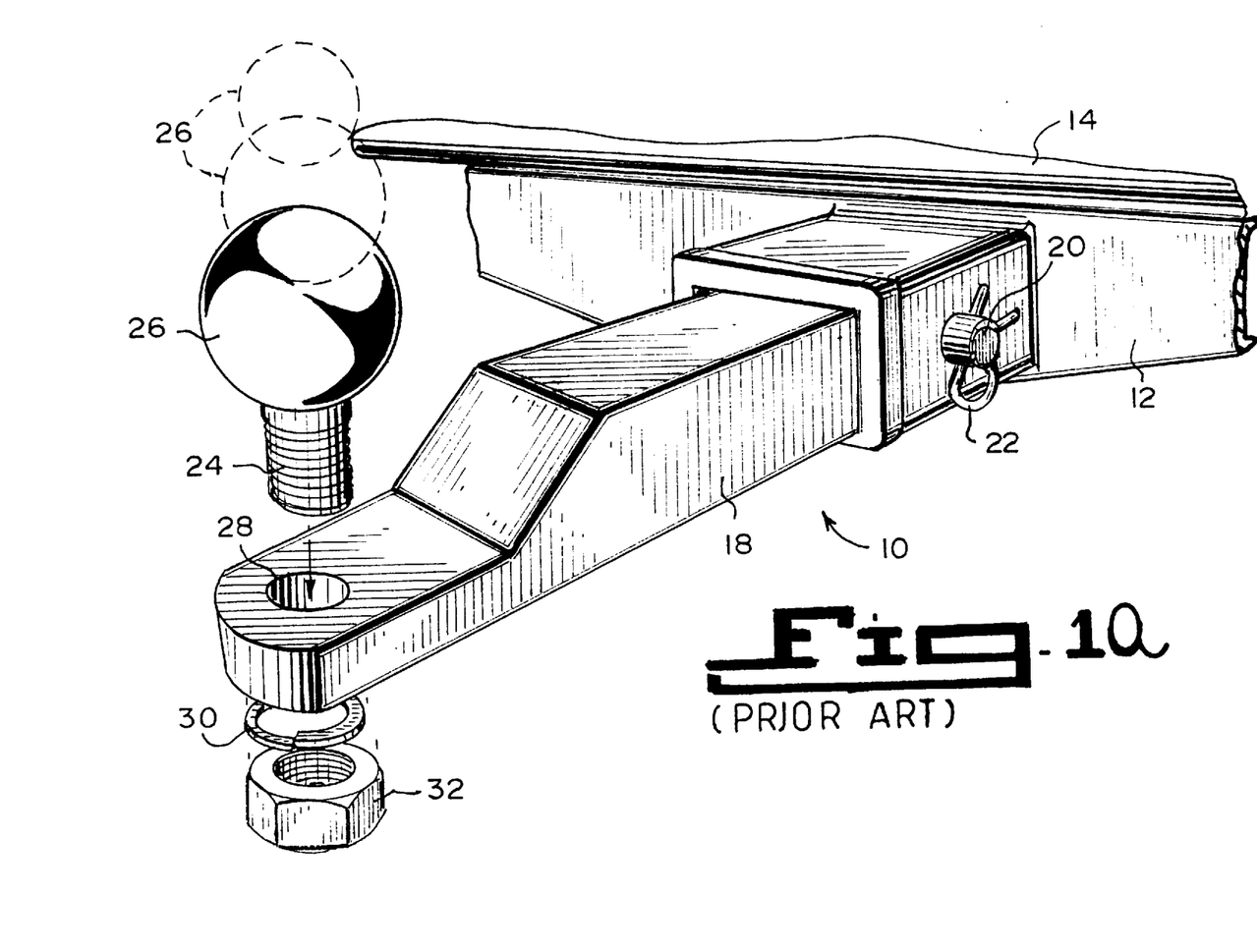

The main frame 38, as shown in FIGS. 5 and 6, consists of the shank 40 having a right angle vertical riser 86 extending up from a second end. The lower plate 62 is affixed onto a top end of the riser 86 of the shank 40. A pair of side plates 88 are provided. Each side plate 88 is affixed between the lower plate 62 and the upper plate 66.

The retaining facility 52 includes a swivel retainer step post 90, having a transverse hole 92 at a lower end. The swivel retainer step post 90 can be inserted through one of the position holes 60 in the disc member 56 and the positioning aperture 70 in the upper plate 66. A safety clip 94 can be inserted through the transverse hole 92 in the swivel retainer step post 90, to keep the swivel retainer step post 90 in place.

LIST OF REFERENCE NUMBERS

10 conventional ball mount hitch (prior art)
12 box end receiver of 10
14 bumper of 16
16 motor vehicle
18 ball mount of 10
20 slide pin of 10
22 clip of 10
24 threaded shank of 26
26 hitch ball of 10
28 socket in 18
30 lock washer of 10
32 retainer nut of 10
34 dial ball mount (invention) for 36
36 trailer hitch
38 main frame of 34
40 shank of 38
42 box end receiver of 36
44 holding component of 34
46 turret of 34
48 hitch ball of 34
50 mounting assembly of 34
52 retaining facility of 34
54 hitch pin for 44
56 disc member for 46
58 central opening in 56
60 position hole in 56
62 lower plate of 38
64 central opening in 62
66 upper plate of 38
68 central opening in 66
70 positioning aperture in 66
72 nut of 50
74 swivel bolt of 50
76 threaded shaft on 74
78 safety pin of 50
80 vertical aperture in 40
82 position pin of 52
84 safety clip of 52
86 riser of 40
88 side plate of 38
90 swivel retainer step post of 52
92 transverse hole in 88
94 safety clip of 52

It will be understood that each of the elements described above, or two or more together may also find a useful application in other types of methods differing from the type described above.

While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A dial ball mount for a trailer hitch comprising:
   a) a main frame having a shank that fits into a box end receiver of the trailer hitch, a lower plate having a central opening therethrough, and an upper plate having a central opening therethrough in alignment with said central opening in said lower plate, said upper plate having a positioning aperture therethrough;
   b) means for holding a first end of said shank of said main frame within the box end receiver of the trailer hitch;
   c) a turret, wherein said turret is a disc member having a central opening and a plurality of position holes radially placed about said central opening;
   d) a plurality of hitch balls radially affixed onto said turret;
   e) means for mounting said turret in a rotatable manner to said main frame, said mounting means including:
      i) a nut affixed to a bottom surface of said lower plate and in alignment with said central opening in said lower plate;
      ii) a swivel bolt having a threaded shaft which extends through said central opening in said disc member, said central opening in said upper plate said central opening in said lower plate and then threaded into said nut, and
      iii) a safety pin which is transversely inserted through said nut and said shaft of said swivel bolt, to hold said swivel bolt securely in place, while allowing said disc member to rotate above said upper plate; and
   f) means for retaining said turret in a stationary manner on said main frame, so that any one of said hitch balls can be aligned into position to receive a matching trailer coupler on a tow bar connected to a trailer.

2. A dial ball mount for a trailer hitch as recited in claim 1, wherein said holding means is a hitch pin that can extend transversely through the box end receiver of the trailer hitch and said first end of said shank.

3. A dial ball mount for a trailer hitch as recited in claim 1, wherein said hitch balls are of various diameter sizes, which can match up to its respective trailer coupler when properly positioned by rotation of said turret and locked by said retaining means.

4. A dial ball mount for a trailer hitch as recited in claim 1, wherein said main frame includes:
   a) said lower plate affixed to a bottom surface at a second end of said shank in an overhanging manner; and
   b) said upper plate affixed to a top surface at said second end of said shank in an overhanging manner.

5. A dial ball mount for a trailer hitch as recited in claim 4, wherein said retaining means includes:
   a) said second end of said shank having a vertical aperture therethrough;
   b) a position pin can be inserted through one of said position holes in said disc member, said positioning aperture in said upper plate and said vertical aperture in said second end of said shank; and c) a safety clip that can be inserted transversely through said vertical aperture in said second end of said shank and said position pin, to keep said position pin in place.

6. A dial ball mount for a trailer hitch as recited in claim 1, wherein said main frame includes:

a) said shank having a right angle vertical riser extending up from a second end;

b) said lower plate affixed onto a top end of said riser of said shank; and c) a pair of side plates, each said side plate affixed between said lower plate and said upper plate.

7. A dial ball mount for a trailer hitch as recited in claim 6, wherein said retaining means includes:

a) a swivel retainer step post having a transverse hole at a lower end, said swivel retainer step post can be inserted through one of said position holes in said disc member and said positioning aperture in said upper plate; and b) a safety clip that can be inserted through said transverse hole in said swivel retainer step post to keep said swivel retainer step post in place.

8. A dial ball mount for a trailer hitch as recited in claim 2, wherein said hitch balls are of various diameter sizes, which can match up to its respective trailer coupler when properly positioned by rotation of said turret and locked by said retaining means.

9. A dial ball mount for a trailer hitch as recited in claim 8, wherein said main frame includes:

a) a lower plate having a central opening therethrough; and b) an upper plate having a central opening therethrough in alignment with said central opening in said lower plate, said upper plate having a positioning aperture therethrough.

10. A dial ball mount for a trailer hitch as recited in claim 9, wherein said mounting means includes:

a) a nut affixed to a bottom surface of said lower plate and in alignment with said central opening in said lower plate;

b) a swivel bolt having a threaded shaft which extends through said central opening in said disc member, said central opening in said upper plate, said central opening in said lower plate and then threaded into said nut; and c) a safety pin which is transversely inserted through said nut and said shaft of said swivel bolt, to hold said swivel bolt securely in place, while allowing said disc member to rotate above said upper plate.

11. A dial ball mount for a trailer hitch as recited in claim 10, wherein said main frame includes:

a) said lower plate affixed to a bottom surface at a second end of said shank in an overhanging manner; and b) said upper plate affixed to a top surface at said second end of said shank in an overhanging manner.

12. A dial ball mount for a trailer hitch as recited in claim 11, wherein said retaining means includes:

a) said second end of said shank having a vertical aperture therethrough;

b) a position pin can be inserted through one of said position holes in said disc member, said positioning aperture in said upper plate and said vertical aperture in said second end of said shank; and c) a safety clip that can be inserted transversely through said vertical aperture in said second end of said shank and said position pin, to keep said position pin in place.

13. A dial ball mount for a trailer hitch as recited in claim 10, wherein said main frame includes:

a) said shank having a right angle vertical riser extending up from a second end;

b) said lower plate affixed onto a top end of said riser of said shank; and c) a pair of side plates, each said side plate affixed between said lower plate and said upper plate.

14. A dial ball mount for a trailer hitch as recited in claim 13, wherein said retaining means includes:

a) a swivel retainer step post having a transverse hole at a lower end, said swivel retainer step post can be inserted through one of said position holes in said disc member and said positioning aperture in said upper plate; and b) a safety clip that can be inserted through said transverse hole in said swivel retainer step post to keep said swivel retainer step post in place.

* * * * *